P. H. BUTLER.
COOKING UTENSIL.
APPLICATION FILED MAY 2, 1917.

1,268,677.

Patented June 4, 1918.

WITNESSES
W. E. Fielding

INVENTOR
Perl H. Butler
BY
ATTORNEY

UNITED STATES PATENT OFFICE.

PERL H. BUTLER, OF WEATOGUE, CONNECTICUT.

COOKING UTENSIL.

1,268,677.  Specification of Letters Patent.  Patented June 4, 1918.

Application filed May 2, 1917. Serial No. 166,017.

*To all whom it may concern:*

Be it known that I, PERL H. BUTLER, a citizen of the United States, residing at Weatogue, in the county of Hartford and State of Connecticut, have invented certain new and useful Improvements in Cooking Utensils, of which the following is a specification.

This invention has relation to cooking utensils, and has for an object to provide a utensil including a section formed in the nature of a frying pan, and a perforated cover adapted to be associated therewith with means for securing the cover in place, whereby the utensil may be utilized as a corn popper.

In addition to the foregoing my invention comprehends improvements in the details of construction and arrangement of the parts to be hereinafter more fully described and particularly set forth in the appended claim.

In the accompanying drawings in which similar and corresponding parts are designated by the same characters of reference throughout the several views in which they appear:

Figure 1:
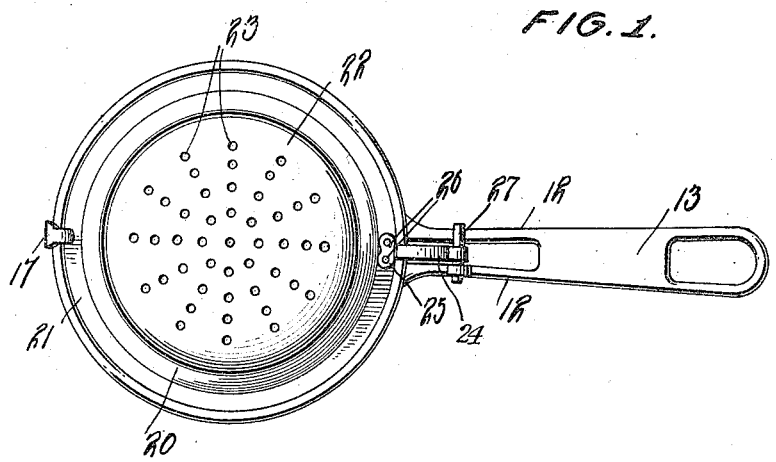
Figure 1, is a view in plan of my improved utensil illustrating the cover in place.
Figure 2:
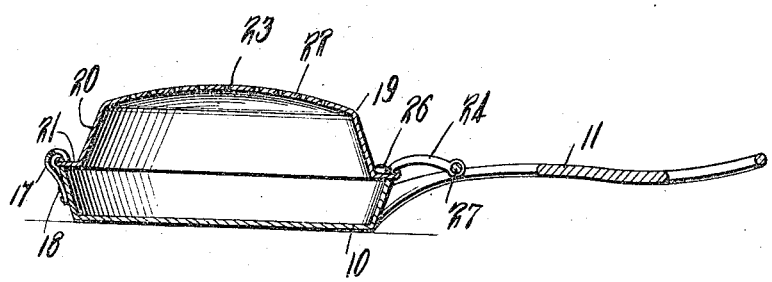
Fig. 2, is a view of the combined utensil in section.
Figure 3:
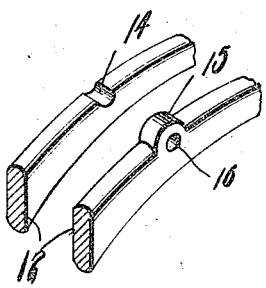
Fig. 3, is a detail view of a portion of the handle illustrating the manner in which the same is formed to permit the association with the handle of the cover securing means.

With reference to the drawings, 10 indicates one member of the utensil which conforms substantially to the configuration of a frying pan, and which is provided with a handle 11 formed of spaced bars or the like 12, connected as at 13 to provide a rigid handle structure. One of the bars 12 is provided upon its upper surface with a notch 14, and the other bar is provided opposite said notch with an enlargement 15 formed with an aperture 16 in transverse alinement with the notch 14. The utensil is provided at a point opposite the point of connection thereto of the handle 11, with a cover engaging member which comprises a strip of metal 17, secured at one end as at 18 to the exterior of the side wall of the utensil, with the opposite end curved whereby its terminal may overhang the edge of the utensil.

A second member of the utensil is indicated at 19 and is in the nature of a cover, having a tapering side wall 20 formed upon its outer edge with a radial annular flange 21 and its bottom 22 rounded and furnished with a series of perforations 23. A cover securing member is provided which consists of an arm 24 having an ear 25 formed at one end, apertured whereby rivets 26 may secure said ear to the radial flange 21 of the section 19. The arm 24, when the cover is placed over the utensil 10 extends between the bars 12 of the handle and is formed with an apertured enlargement through which a pin 27 extends transversely.

The member 10 of the utensil may be used in its ordinary capacity of a frying pan with the member 19 detached therefrom. However, when it is desired to pop corn, the cover 19 is applied thereto by inserting the radial flange beneath the overhanging end of the engaging member 17, and then inserting one end of the transverse pin 27 in the aperture 16 of the handle permitting the other end of the pin to rest in the notch 14. The cover will thus be securely held in place, and if corn has been previously introduced into the section 10 the entire utensil may be inserted and held over a blaze.

While I have illustrated and described my invention with some degree of particularity, I realize that in practice various alterations thereover may be made and I therefore desire to reserve the right and privilege of changing the form of the details of construction or otherwise altering the arrangement of the co-related parts, without departing from the spirit of the invention or the scope of the appended claim.

Having thus described my invention what I claim as new and desire to secure by Letters Patent is:—

In a cooking utensil, a pan, a handle therefor, comprising a pair of spaced bars, one bar having a notch, the other bar having a perforated enlargement, a hook shaped element secured to the pan at a point opposite the point of attachment thereto of the handle, a perforated cover having a marginal flange adapted to be secured beneath the hook shaped element, and an arm rigidly secured to the flange at one end and having an apertured enlargement formed at its other end, and a pin secured in said apertured enlargement adapted to be inserted in the apertured enlargement of the handle and in the notch, to retain the cover in place.

In testimony whereof I affix my signature in presence of two witnesses.

PERL H. BUTLER.

Witnesses:
CHARLES A. PURCI, Jr.,
ARTHUR E. LATHROP.

Copies of this patent may be obtained for five cents each, by addressing the "Commissioner of Patents, Washington, D. C."